United States Patent
Noy et al.

(10) Patent No.: US 6,539,019 B1
(45) Date of Patent: Mar. 25, 2003

(54) METHODS AND APPARATUS FOR AUTOMATICALLY CONNECTING A DYNAMIC HOST CONFIGURATION PROTOCOL (DHCP) CLIENT NETWORK DEVICE TO A VIRTUAL LOCAL AREA NETWORK (VLAN)

(75) Inventors: Ariel Noy, Herzlia (IL); Sharon Barkai, Shoam (IL); Zeev Vax, Tel-Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/317,786

(22) Filed: May 24, 1999

(51) Int. Cl.[7] ............................................. H04L 12/56
(52) U.S. Cl. ................................................. 370/395.53
(58) Field of Search .............................. 370/352, 395.1, 370/395.2, 395.3, 395.5, 395.52, 395.53, 395.54, 395.6, 401, 465

(56) References Cited

U.S. PATENT DOCUMENTS

| | | |
|---|---|---|
| 4,823,338 A | 4/1989 | Chan et al. |
| 4,975,906 A | 12/1990 | Takiyasu et al. |
| 5,214,646 A | 5/1993 | Yacoby |

(List continued on next page.)

FOREIGN PATENT DOCUMENTS

| | | | |
|---|---|---|---|
| WO | WO97/04386 | 6/1997 | ............ G06F/9/455 |
| WO | WO98/02821 | 1/1998 | ............ G06F/13/00 |

OTHER PUBLICATIONS

Rajaravivarma, V. "Virtual Local Area Network Technology and Applications" System Theory, 1997, pp. 49–52, Mar. 9–11, 1997.*

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

(List continued on next page.)

Primary Examiner—Hassan Kizou
Assistant Examiner—Anh-Vu Ly
(74) Attorney, Agent, or Firm—Howard Zaretsky, Esq.

(57) ABSTRACT

A method for automatically connecting a DHCP endpoint to a VLAN in an ATM network having a switch operative to provide LAN emulation for a plurality of non-ATM endpoints, the method including the steps of maintaining a LEC for the VLAN in the absence of any request by any of the endpoints to communicate via the VLAN, the LEC having been previously established for the VLAN, connecting the DHCP endpoint to a port on the switch, determining a predefined association between the VLAN and either the address of the port or the network address of the DHCP endpoint, and mapping either the network address of the DHCP endpoint or the address of the port to the LEC for communication via the VLAN.

19 Claims, 2 Drawing Sheets

U.S. PATENT DOCUMENTS

| | | | |
|---|---|---|---|
| 5,280,476 A | 1/1994 | Kojima et al. | |
| 5,280,481 A | 1/1994 | Chang et al. | |
| 5,315,582 A | 5/1994 | Morizono et al. | |
| 5,321,693 A | 6/1994 | Perlman | |
| 5,321,694 A | 6/1994 | Chang et al. | |
| 5,329,527 A | 7/1994 | Ujihashi et al. | |
| 5,329,619 A | 7/1994 | Page et al. | 395/200 |
| 5,345,558 A | 9/1994 | Opher et al. | 395/200 |
| 5,390,184 A | 2/1995 | Morris | |
| 5,394,402 A | 2/1995 | Ross | |
| 5,408,469 A | 4/1995 | Opher et al. | |
| 5,444,702 A | 8/1995 | Burnett et al. | |
| 5,483,536 A | 1/1996 | Gunji et al. | |
| 5,519,704 A | 5/1996 | Farinacci et al. | |
| 5,548,646 A | 8/1996 | Aziz et al. | 380/23 |
| 5,548,723 A | 8/1996 | Pettus | 395/200.01 |
| 5,550,816 A | 8/1996 | Hardwick et al. | |
| 5,550,818 A | 8/1996 | Brackett et al. | |
| 5,566,014 A | 10/1996 | Glance | 359/124 |
| 5,583,865 A | 12/1996 | Esaki et al. | 370/397 |
| 5,600,644 A | 2/1997 | Chang et al. | 370/404 |
| 5,633,869 A | 5/1997 | Burnett et al. | 370/396 |
| 5,659,542 A | 8/1997 | Bell et al. | 370/496 |
| 5,666,487 A | 9/1997 | Goodman et al. | 395/200.76 |
| 5,812,552 A * | 9/1998 | Arora et al. | 370/401 |
| 5,920,699 A * | 7/1999 | Bare | 395/200.55 |
| 5,949,783 A * | 9/1999 | Husak et al. | 370/396 |
| 5,968,126 A * | 10/1999 | Ekstrom et al. | 709/225 |
| 6,047,325 A * | 4/2000 | Jain et al. | 709/227 |
| 6,167,052 A * | 12/2000 | McNeill et al. | 370/399 |
| 6,269,076 B1 * | 7/2001 | Shamir et al. | 370/217 |
| 6,286,038 B1 * | 9/2001 | Reichmeyer et al. | 709/220 |
| 6,289,017 B1 * | 9/2001 | Shani et al. | 370/395 |

OTHER PUBLICATIONS

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Parker, T. et al., "TCP/IP Unleashed", SAMS Publishing (1996), pp. 418–429.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

"VLAN Information", printed from website http://net21.ucdavis.edu/newvlan.htm, Oct. 29, 1998, 13 pages.

* cited by examiner

METHODS AND APPARATUS FOR AUTOMATICALLY CONNECTING A DYNAMIC HOST CONFIGURATION PROTOCOL (DHCP) CLIENT NETWORK DEVICE TO A VIRTUAL LOCAL AREA NETWORK (VLAN)

FIELD OF THE INVENTION

The present invention relates to computer networks in general, and more particularly relates to methods and apparatus for automatically connecting a Dynamic Host Configuration Protocol (DHCP) client network device to a Virtual Local Area Network (VLAN).

BACKGROUND OF THE INVENTION

With the proliferation of local area networks (LANs), the need has developed for more powerful tools to manage LANs as they increase in complexity and size. One technique used for managing large networks involves defining one or more virtual local area networks (VLANs), allowing end-user network devices, also referred to herein as "endpoints," to be logically grouped together and communicate as if they are on a common LAN, whether or not they reside on the same physical LAN segment. Some VLAN implementations allow for network switches to automatically identify an endpoint as it is physically attached to a switch port and assign it to a VLAN, either according to a default policy or in accordance with a predefined relationship between the endpoint address and a particular VLAN. In this manner an endpoint may be moved from one physical LAN segment to another while preserving its association with a particular VLAN.

VLANs may be implemented in various types of networks, including Asynchronous Transfer Mode (ATM) networks. Where non-ATM-based networks communicate via ATM networks, LAN Emulation (LANE) may be employed to provide address resolution between ATM and non-ATM addresses, such as Media Access Control (MAC) addresses. Where VLANs and LANE are both used in an ATM network, a network switch to which a non-ATM endpoint is attached may establish a LAN Emulation Client (LEC) to support communications between the non-ATM endpoint and another non-ATM endpoint in a given VLAN. A switch may simultaneously support multiple LECs for multiple VLANs, adding a LEC as communication via a VLAN is requested by one or more endpoints that belong to the VLAN, and removing the LEC when communications over the VLAN are concluded or idle for a period of time.

Further complicating the management of a VLAN/ATM/LANE environment is the need to support endpoints which dynamically request the assignment of their network addresses in accordance with the Dynamic Host Configuration Protocol (DHCP). When a DHCP endpoint is attached to a network it attempts to find a DHCP server which offers the endpoint an address for its use. A DHCP endpoint that does not find a DHCP server within a predefined period will "time out" and cease its attempt to find a DHCP server. Unfortunately, this timeout period is usually much shorter than the time it takes to map a DHCP endpoint upon being connected to a switch port to its VLAN and establish a LEC for the VLAN, thus virtually guaranteeing a DHCP timeout.

SUMMARY OF THE PRESENT INVENTION

The present invention seeks to provide methods and apparatus for automatically connecting a Dynamic Host Configuration Protocol (DHCP) client network device to a Virtual Local Area Network (VLAN) that overcome disadvantages related to the prior art.

There is thus provided in accordance with a preferred embodiment of the present invention a method for automatically connecting a DHCP endpoint to a VLAN in an ATM network having a switch operative to provide LAN emulation for a plurality of non-ATM endpoints, the method including the steps of maintaining a LEC for the VLAN in the absence of any request by any of the endpoints to communicate via the VLAN, the LEC has been previously-established for the VLAN, connecting the DHCP endpoint to a port of the switch, determining a predefined association between the VLAN and either of the address of the port and the network address of the DHCP endpoint, and mapping either of the network address of the DHCP endpoint and the address of the port to the LEC for communication via the VLAN.

Further in accordance with a preferred embodiment of the present invention any of the maintaining, determining, and mapping steps are performed by the switch.

Still further in accordance with a preferred embodiment of the present invention the determining step is performed by a network management station and the method further includes the steps of requesting the network address of the DHCP endpoint from the DHCP endpoint via the switch, and communicating the determination of the predefined association between the VLAN and either of the address of the port and the network address of the DHCP endpoint to the switch.

Additionally in accordance with a preferred embodiment of the present invention the network address of the DHCP endpoint is a MAC address.

Moreover in accordance with a preferred embodiment of the present invention the method further includes the steps of maintaining a plurality of LECs for a plurality of VLANs in the absence of any request by any of the endpoints to communicate via any of the plurality of VLANs, the plurality of LECs have been previously-established for the i of VLANs, and discontinuing maintenance of a least-recently used one of the plurality of LECs.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
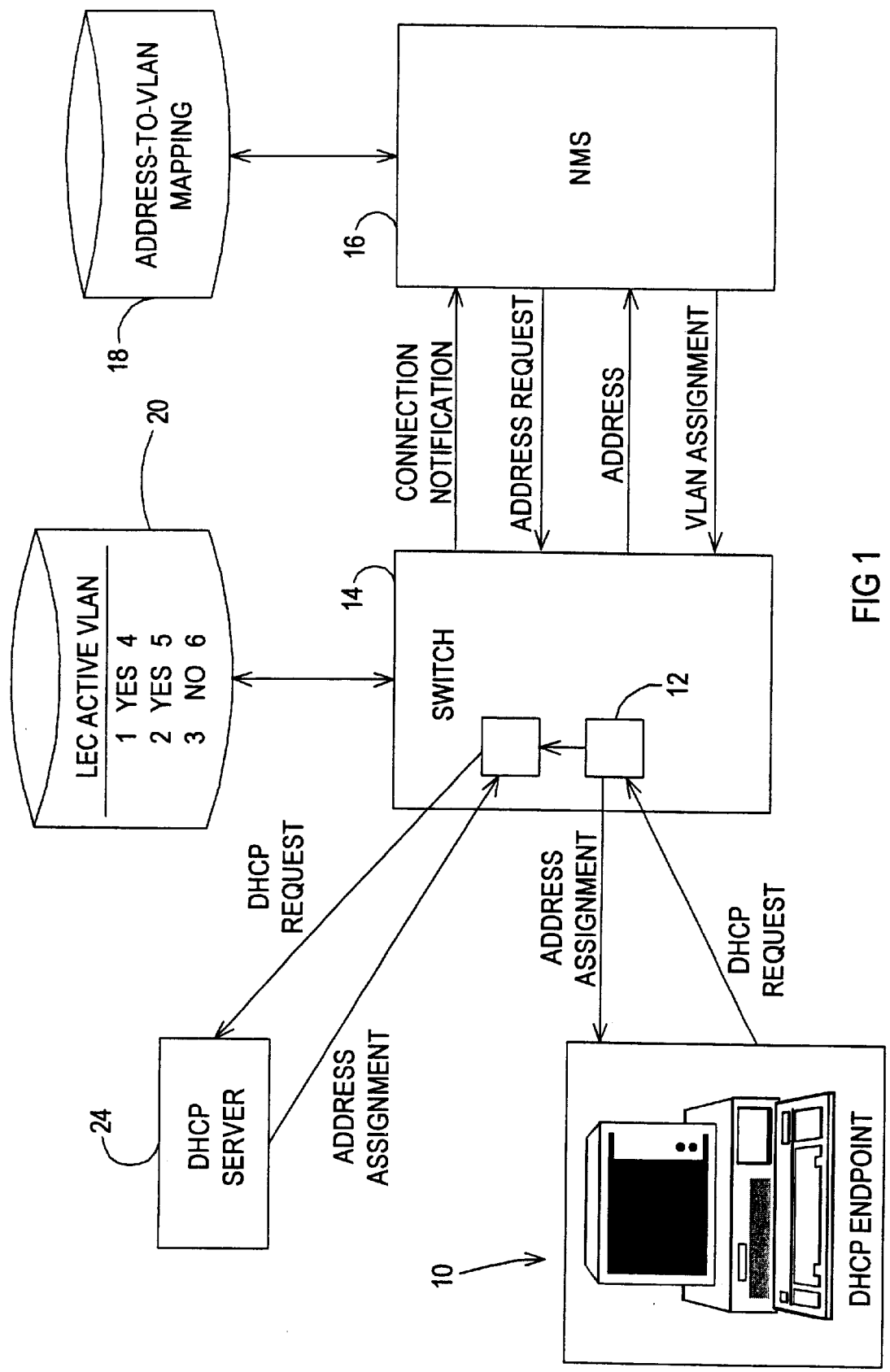
FIG. 1 is a simplified flow diagram illustration of a system in which a Dynamic Host Configuration Protocol (DHCP) client network device is automatically connected to a Virtual Local Area Network (VLAN), constructed and operative in accordance with a preferred embodiment of the present invention.
Figure 2:
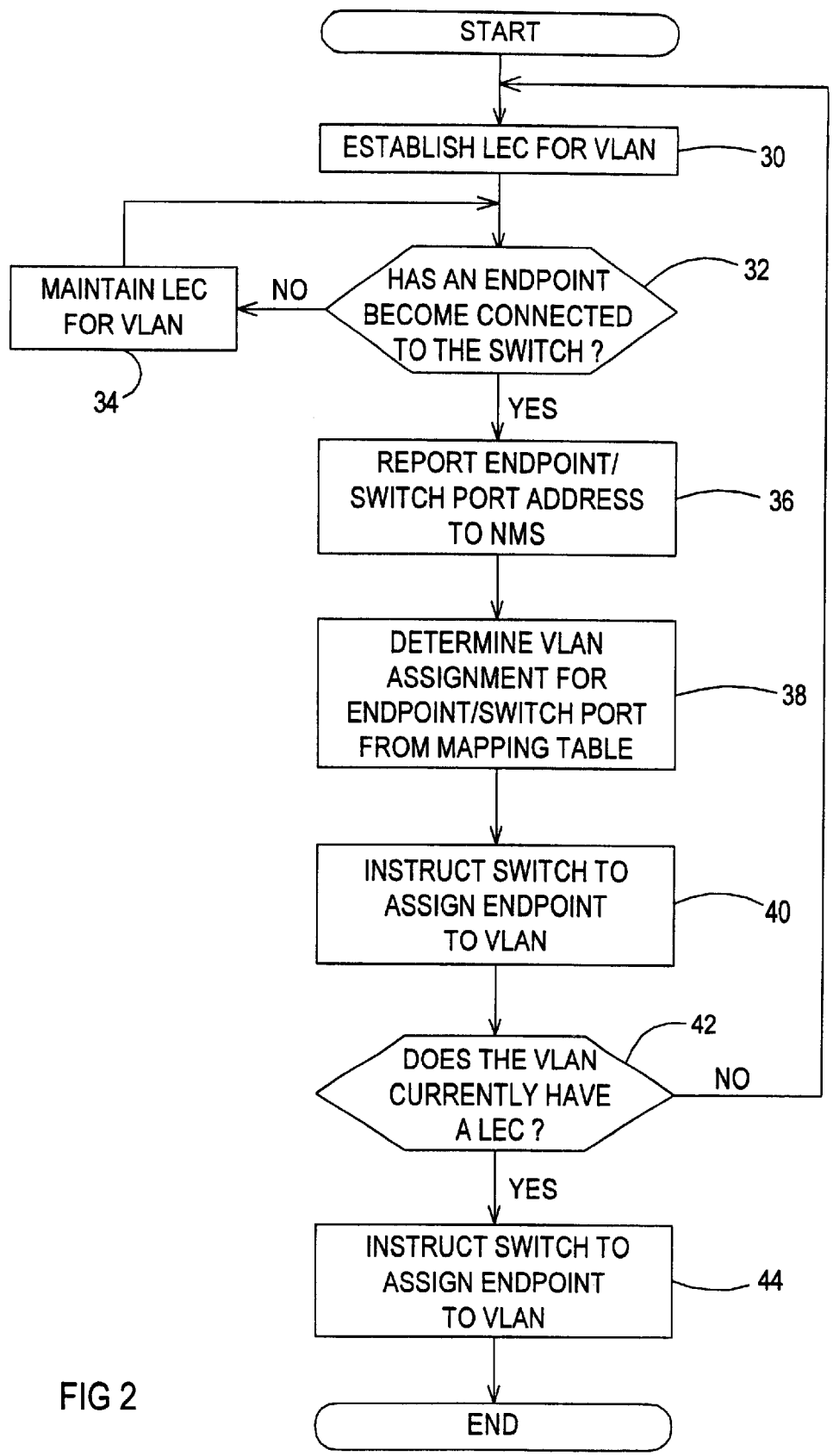
FIG. 2 is a simplified flowchart illustration of a method for automatically connecting a Dynamic Host Configuration Protocol (DHCP) client network device to a Virtual Local Area Network (VLAN) useful in understanding the system of FIG. 1, operative in accordance with a preferred embodiment of the present invention.

Reference is now made to FIG. 1 which is a simplified flow diagram illustration of a system in which a Dynamic Host Configuration Protocol (DHCP) client network device is automatically connected to a Virtual Local Area Network (VLAN), constructed and operative in accordance with a preferred embodiment of the present invention. FIG. 2 is a simplified flowchart illustration of a method for automatically connecting a Dynamic Host Configuration Protocol (DHCP) client network device to a Virtual Local Area Network (VLAN) intended to aid in understanding the system of FIG. 1, operative in accordance with a preferred embodiment of the present invention.

In the system of FIG. 1, a computer 10 is shown connected to a port 12 of an ATM switch 14. As shown in FIG. 1, computer 10 is a DHCP client. Switch 14 is in communication with a network management system (NMS) 16 to which switch 14 reports that computer 10 has connected to switch 14. Switch 14 may be triggered to report to NMS 16 either as the result of a simple network management protocol (SNMP) trap being set to detect new connections to ports on switch 14 or switch 14 may otherwise be periodically polled by NMS 16 for new connections. If the address of computer 10, such as a MAC address, and/or the port address of switch 14 to which computer 10 has been connected, have not yet been reported to NMS 16, NMS 16 then requests one or both addresses from switch 14, which switch 14 then provides to NMS 16.

A table 18 is preferably provided mapping endpoint or switch addresses to VLANs in accordance with specific, predetermined mappings or otherwise in accordance with a default address-to-VLAN mapping policy where no specific address-to-VLAN mapping exists. NMS 16 preferably queries table 18 to determine the VLAN to which computer 10 is to be assigned based on computer 10's MAC address and/or the address of port 12. NMS 16 then reports to switch 14 the VLAN to which computer 10 is to be assigned.

Switch 14 preferably maintains a table 20 mapping LECs to VLANs. Upon receiving computer 10's VLAN assignment from NMS 16, switch 14 queries table 20 to determine the LEC that is currently assigned to the VLAN designated for computer 10. If a LEC exists for the VLAN, switch 14 connects computer 10 to its designated VLAN. If no LEC exists, switch 14 must establish an LEC in order to support communications via the VLAN.

It is a particular feature of the invention that once switch 14 establishes a LEC for a VLAN it maintains the LEC even when it is no longer needed, such as in the absence of any request by any ATM endpoints to communicate via the VLAN. Thus, in the example shown, should computer 10 be assigned to VLAN 6 for which a LEC 3 was previously established but which is no longer active, such as is shown in table 20 at reference numeral 22, computer 10 may nonetheless be connected to VLAN 6 and serviced by LEC 3, as long as LEC 3 has been maintained by switch 14. Switch 14 may maintain any number of LECs for inactive VLANs, being limited only by its memory and processing capacity. Where such capacity would be exceeded, switch 14 preferably discontinues maintenance of the LEC which was least-recently used.

Once computer 10 connects to port 12 of switch 14, it attempts to find a DHCP server 24 which may offer computer 10 an address for its use. If switch 14 has not maintained a LEC for the VLAN to which computer 10 is assigned, computer 10 will typically not find DHCP server 24 within the timeout period and will stop searching for DHCP server 24, since this timeout period is typically much shorter than the time it takes to map computer 10 upon being connected to port 12 to its VLAN and establish a LEC for the VLAN. By maintaining a LEC for the VLAN, even while the VLAN is inactive, computer 10 finds DHCP server 24 within the timeout period and receives an address.

(New) A flow chart illustrating the method of the present invention for automatically connecting a DHCP client network device to a VLAN is shown in FIG. 2. The method is performed on the switch within the ATM network. The first step in the method is to establish a LEC for each VLAN to be supported (step 30). The switch then checks if a DHCP client (endpoint) gets connected to the switch (step 32). If no DHCP client is detected, the switch continuously maintains LECs for associated VLANs (step 34).

(New) Once the switch detects a DHCP endpoint connected to it, it reports the endpoint MAC address or switch port (depending on the configuration) to the NMS (step 36). The NMS functions to determine a VLAN assignment for the endpoint (or switch port) from the NMS mapping table (step 38). The switch receives instructions to assign the endpoint to a particular VLAN (step 40).

(New) If the VLAN currently does not have a LEC (step 42), the method continues with step 30 wherein a LEC is established for the VLAN. If the VLAN does have a LEC associated with it (step 42), the switch assigns the endpoint to the VLAN (step 44).

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of automatically connecting a Dynamic Host Configuration Protocol (DHCP) endpoint to a Virtual Local Area Network (VLAN) in an Asynchronous Transfer Mode (ATM) network having a switch operative to provide Local Area Network (LAN) emulation for a plurality of non-ATM endpoints, the method comprising the steps of:

maintaining a LAN Emulation Client (LEC) for said VLAN in an absence of a request by any of said endpoints to communicate via said VLAN, wherein said LEC has been previously established for said VLAN;

determining a predefined association between said VLAN and said DHCP endpoint upon connection of said DHCP endpoint to said switch; and mapping said DHCP endpoint to said LEC for communication via said VLAN.

2. A method according to claim 1 wherein any of said maintaining, determining, and mapping steps are performed by said switch.

3. A method according to claim 1 wherein said determining step is performed by a network management station and further comprises the steps of:

requesting a network address of said DHCP endpoint from said DHCP endpoint via said switch; and communicating said determination of said predefined association between said VLAN and either of an address of a port and the network address of said DHCP endpoint to said switch.

4. A method according to claim 1 wherein a network address of said DHCP endpoint is a Media Access Control (MAC) address.

5. A method according to claim 1 and further comprising the steps of:
maintaining a plurality of LECs for a plurality of VLANs in the absence of the request by any of said endpoints to communicate via any of said plurality of VLANs, wherein said plurality of LECs have been previously established for said plurality of VLANs; and
discontinuing maintenance of a least-recently used one of said plurality of LECs.

6. The method according to claim 1, wherein said step of determining a predefined association comprises making an association between said VLAN and an address of a port.

7. The method according to claim 1, wherein said step of determining a predefined association comprises making an association between said VLAN and a Media Access Control (MAC) address of said DHCP endpoint.

8. The method according to claim 1, wherein said step of mapping comprises mapping an address of a port to said LEC.

9. The method according to claim 1, wherein said step of mapping comprises mapping a Media Access Control (MAC) address of said DHCP endpoint to said LEC.

10. A method for automatically connecting a Dynamic Host Configuration Protocol (DHCP) endpoint to a Virtual Local Area Network (VLAN) upon connection of said DHCP endpoint to an Asynchronous Transfer Mode (ATM) network switch, said ATM network switch adapted to provide LAN emulation services for a plurality of DHCP endpoints, the method comprising the steps of:
creating predefined associations between each VLAN to be supported by said switch and one or more DHCP endpoints;
establishing a plurality of LAN Emulation Clients (LECs), each LEC associated with a different VLAN, wherein said plurality of LECs are continuously maintained in said switch even in an absence of a request by a DHCP endpoint to connect to a VLAN during which time a VLAN is inactive;
upon connection of a DHCP endpoint to said switch, searching for a VLAN associated with said connected DHCP endpoint;
determining a first LEC associated with said VLAN; and
assigning said connected DHCP endpoint to said first LEC so as to enable communications via said VLAN.

11. The method according to claim 10, wherein said step of creating predefined associations comprises making associations between each VLAN and a port address.

12. The method according to claim 10, wherein said step of creating predefined associations comprises making associations between each VLAN and a DHCP endpoint Media Access Control (MAC) address.

13. The method according to claim 10, wherein said step of searching comprises searching for a VLAN associated with a port address said DHCP endpoint is connected to.

14. The method according to claim 10, wherein said step of searching comprises searching for a VLAN associated with a Media Access Control (MAC) address of said connected DHCP endpoint.

15. An Asynchronous Transfer Mode (ATM) network switch for automatically connecting a Dynamic Host Configuration Protocol (DHCP) endpoint to a Virtual Local Area Network (VLAN) upon connection of said DHCP endpoint to said switch, said switch adapted to provide LAN emulation services for a plurality of DHCP endpoints, comprising:
means for creating predefined associations between each VLAN to be supported by said switch and one or more DHCP endpoints;
means for establishing a plurality of LAN Emulation Clients (LECs), each LEC associated with a different VLAN, wherein said plurality of LECs are continuously maintained in said switch even in an absence of a request by a DHCP endpoint to connect to a VLAN during which time a VLAN is inactive;
means for upon connection of a DHCP endpoint to said switch, searching for a VLAN associated with said connected DHCP endpoint;
means for determining a first LEC associated with said VLAN; and
means for assigning said connected DHCP endpoint to said first LEC so as to enable communications via said VLAN.

16. The switch according to claim 15, wherein said means for creating predefined associations comprises means for making associations between each VLAN and a port address.

17. The switch according to claim 15, wherein said means for creating predefined associations comprises means for making associations between each VLAN and a DHCP endpoint Media Access Control (MAC) address.

18. The switch according to claim 15, wherein said means for searching comprises means for searching for a VLAN associated with a port address said DHCP endpoint is connected to.

19. The switch according to claim 15, wherein said means for searching comprises means for searching for a VLAN associated with a Media Access Control (MAC) address of said connected DHCP endpoint.

* * * * *